United States Patent
Hosokawa et al.

(10) Patent No.: US 10,628,522 B2
(45) Date of Patent: Apr. 21, 2020

(54) CREATING RULES AND DICTIONARIES IN A CYCLICAL PATTERN MATCHING PROCESS

(71) Applicant: International Business Machines Corporation, Armonk, NY (US)

(72) Inventors: Satoshi Hosokawa, Funabashi (JP); Shunsuke Ishikawa, Tokyo (JP); Chikako Oyanagi, Tokyo (JP); Yuichi Suzuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/193,539

(22) Filed: Jun. 27, 2016

(65) Prior Publication Data

US 2017/0371858 A1 Dec. 28, 2017

(51) Int. Cl.
*G06F 17/27* (2006.01)
*G06F 3/0482* (2013.01)
*G06F 16/36* (2019.01)

(52) U.S. Cl.
CPC ........ *G06F 17/2735* (2013.01); *G06F 3/0482* (2013.01); *G06F 16/36* (2019.01); *G06F 17/277* (2013.01)

(58) Field of Classification Search
CPC ........... G06F 17/30864; G06F 17/3071; G06F 17/2785; G06F 17/2247; G06F 17/30743; G06F 17/3064; G06F 17/241; G06F 17/273; G06F 17/30905; G06F 17/24; G06F 17/211; G06F 3/04886; G06F 3/0481; G06F 17/2705; G06F 16/322; G06F 16/367; G06F 16/319; G06F 16/951; G06F 17/278; G06F 17/2818; G06F 17/218; G06F 17/2735; G06F 17/2795; G06Q 30/025
See application file for complete search history.

(56) References Cited

U.S. PATENT DOCUMENTS

| | | | | |
|---|---|---|---|---|
| 5,642,522 A | * | 6/1997 | Zaenen | G06F 17/274 704/9 |
| 5,848,386 A | * | 12/1998 | Motoyama | G06F 17/272 704/5 |
| 5,852,801 A | * | 12/1998 | Hon | G10L 15/22 704/243 |
| 5,907,841 A | * | 5/1999 | Sumita | G06F 16/345 |

(Continued)

OTHER PUBLICATIONS

"Content Analytics Studio for advanced text analytics", IBM Knowledge Center, IBM Watson Explorer 10.0.0, <http://www.ibm.com/support/knowledgecenter/SS8NLW_10.0.0/com.ibm.discovery.es.ta.doc/iiystacastudio.htm>, printed May 10, 2016, 1 page.

(Continued)

*Primary Examiner* — Huyen X Vo
(74) *Attorney, Agent, or Firm* — Gilbert Harmon, Jr.

(57) ABSTRACT

In an approach to rule and dictionary creation based on an improvement cycle, a computing device receives a corpus, wherein the corpus comprises textual data. The computing device stores, in a rule database, a rule based on a user input. The computing device stores, in a dictionary, one or more words based on the corpus. The computing device updates one or more of the rule database and the dictionary based on an improvement cycle comprising user selections from system-generated recommendations.

20 Claims, 7 Drawing Sheets

(56) References Cited

U.S. PATENT DOCUMENTS

| | | | |
|---|---|---|---|
| 6,789,057 B1* | 9/2004 | Morimoto | G06F 17/271 704/2 |
| 6,836,759 B1* | 12/2004 | Williamson | G10L 15/22 382/181 |
| 2003/0061031 A1* | 3/2003 | Kida | G06F 17/2863 704/10 |
| 2004/0006469 A1* | 1/2004 | Kang | G10L 15/187 704/254 |
| 2004/0181512 A1* | 9/2004 | Burdick | G06F 17/30303 |
| 2005/0210383 A1* | 9/2005 | Cucerzan | G06F 17/273 715/257 |
| 2006/0007189 A1* | 1/2006 | Gaines, III | G06F 17/243 345/179 |
| 2006/0074631 A1* | 4/2006 | Wang | G06F 17/27 704/9 |
| 2006/0080310 A1* | 4/2006 | Gordon | G06F 17/30719 |
| 2006/0253273 A1* | 11/2006 | Feldman | G06F 17/2715 704/9 |
| 2007/0067280 A1* | 3/2007 | Zhou | G06F 17/278 |
| 2009/0157611 A1* | 6/2009 | Kipersztok | G06F 17/30672 |
| 2010/0174528 A1* | 7/2010 | Oya | G06F 17/2735 704/10 |
| 2011/0004464 A1* | 1/2011 | Martino | G06F 17/2765 704/9 |
| 2011/0055206 A1* | 3/2011 | Martin | G06F 17/2775 707/723 |
| 2011/0202848 A1* | 8/2011 | Ismalon | G06F 17/3089 715/738 |
| 2011/0246464 A1* | 10/2011 | Okamoto | G06F 17/30014 707/737 |
| 2011/0295854 A1* | 12/2011 | Chiticariu | G06F 16/313 707/737 |
| 2012/0023103 A1* | 1/2012 | Soderberg | G06F 17/3028 707/739 |
| 2012/0066235 A1* | 3/2012 | Itakura | G06F 17/30035 707/751 |
| 2012/0072204 A1* | 3/2012 | Nasri | G06F 17/2229 704/9 |
| 2012/0136887 A1* | 5/2012 | Cha | G06F 17/30867 707/767 |
| 2012/0239682 A1* | 9/2012 | Wedeniwski | G06F 17/30663 707/769 |
| 2013/0006609 A1* | 1/2013 | Dhoolia | G06F 17/274 704/9 |
| 2013/0046772 A1* | 2/2013 | Gu | G06F 17/30029 707/751 |
| 2013/0091142 A1* | 4/2013 | Joseph | G06Q 30/0277 707/748 |
| 2013/0191718 A1* | 7/2013 | Luke | G06F 17/241 715/230 |
| 2013/0254232 A1* | 9/2013 | Reimer | G06F 17/30029 707/772 |
| 2013/0318076 A1* | 11/2013 | Chiticariu | G06F 17/2735 707/723 |
| 2014/0108994 A1* | 4/2014 | Medlock | G06F 3/04886 715/773 |
| 2014/0188899 A1* | 7/2014 | Whitnah | G06F 17/30646 707/749 |
| 2014/0188935 A1* | 7/2014 | Vee | G06F 17/3043 707/771 |
| 2014/0281941 A1* | 9/2014 | Spellward | G06F 17/211 715/256 |
| 2014/0304661 A1* | 10/2014 | Topakas | G06F 3/04815 715/848 |
| 2015/0019204 A1* | 1/2015 | Simard | G06F 17/2735 704/9 |
| 2015/0039634 A1* | 2/2015 | Mo | G06F 17/30702 707/754 |
| 2015/0067486 A1* | 3/2015 | Hochman | G06F 17/273 715/257 |
| 2015/0077419 A1* | 3/2015 | Abuelsaad | G06F 17/27 345/440 |
| 2015/0134666 A1* | 5/2015 | Gattiker | G06F 17/30598 707/739 |
| 2015/0205858 A1* | 7/2015 | Xie | G06Q 50/01 707/755 |
| 2015/0227619 A1* | 8/2015 | Xie | G06F 17/30864 707/706 |
| 2015/0277901 A1* | 10/2015 | Karle | G06F 11/3688 717/120 |
| 2015/0278189 A1* | 10/2015 | Booth | G06F 16/367 704/9 |
| 2015/0309984 A1* | 10/2015 | Bradford | G06F 17/2863 704/8 |
| 2015/0363384 A1* | 12/2015 | Williams | G06F 17/2785 704/9 |
| 2016/0063115 A1* | 3/2016 | Ayan | G06Q 50/01 707/722 |
| 2016/0239474 A1* | 8/2016 | Maruyama | G06Q 10/10 |
| 2016/0328147 A1* | 11/2016 | Zhang | G06F 3/0237 |
| 2016/0350288 A1* | 12/2016 | Wick | G06F 17/2735 |
| 2016/0357853 A1* | 12/2016 | Moore | G06F 17/30684 |
| 2016/0373456 A1* | 12/2016 | Vermeulen | G06F 17/30675 |
| 2016/0379213 A1* | 12/2016 | Isaacson | G06Q 20/12 705/44 |

OTHER PUBLICATIONS

"Content Analytics Studio for advanced text analytics", IBM Knowledge Center, IBM Watson Explorer 11.0.0, <https://www.ibm.com/support/knowledgecenter/SS8NLW_11.0.0/com.ibm.discovery.es.ta.doc/iiystacastudio.htm>, printed May 10, 2016, 1 page.

"IBM Watson Knowledge Studio", IBM Watson, Offerings, <http://www.ibm.com/smarterplanet/us/en/ibmwatson/knowledge-studio.html>, printed May 10, 2016, 2 pages.

* cited by examiner

CREATING RULES AND DICTIONARIES IN A CYCLICAL PATTERN MATCHING PROCESS

TECHNICAL FIELD OF THE INVENTION

The present disclosure relates generally to natural language processing, and more particularly to creation of analysis rules and dictionaries for extracting information from textual data.

BACKGROUND OF THE INVENTION

Analysis rules are a tool for extracting meaningful information from textual data. In order to create an analysis rule (or "rule"), a user may need to create a child dictionary (or "dictionary") that includes several words, so that the included words may then be identified in token sequences extracted from the textual data. Conventional technology requires that the user provide both token sequences that should be matched by an ideal rule and words to include in the dictionary.

SUMMARY

According to one embodiment of the present invention, a computer-implemented method, a computer program product, and/or a computer system is provided. A computing device receives a corpus, wherein the corpus comprises textual data. The computing device stores, in a rule database, a rule based on a first user input. The computing device stores, in a dictionary, one or more words based on a second user input. The computing device updates the rule database and the dictionary based on an improvement cycle comprising user selections from system-generated recommendations.

DETAILED DESCRIPTION

Embodiments described herein provide methods, computer program products, and/or computer systems that enable improvement-cycle-based creation of rules and dictionaries for extracting meaningful information from textual data.

Embodiments of the present invention may include one or more of the following features, characteristics, and/or advantages: (i) an improvement cycle comprising recommendation of (a) token sequences on which rules can be based and (b) dictionary words, wherein user selection of a recommended rule or dictionary word triggers generation of another set of recommendations based on the selection; (ii) rapid listing and verification of token sequences that may be matched by rules; (iii) provision for user examination of recommended token sequences based on previously added dictionary words; (iv) rapid listing of words for inclusion in dictionaries; and/or (v) assistance to the user, who may otherwise overlook words that should be added to a dictionary.

Figure 1:
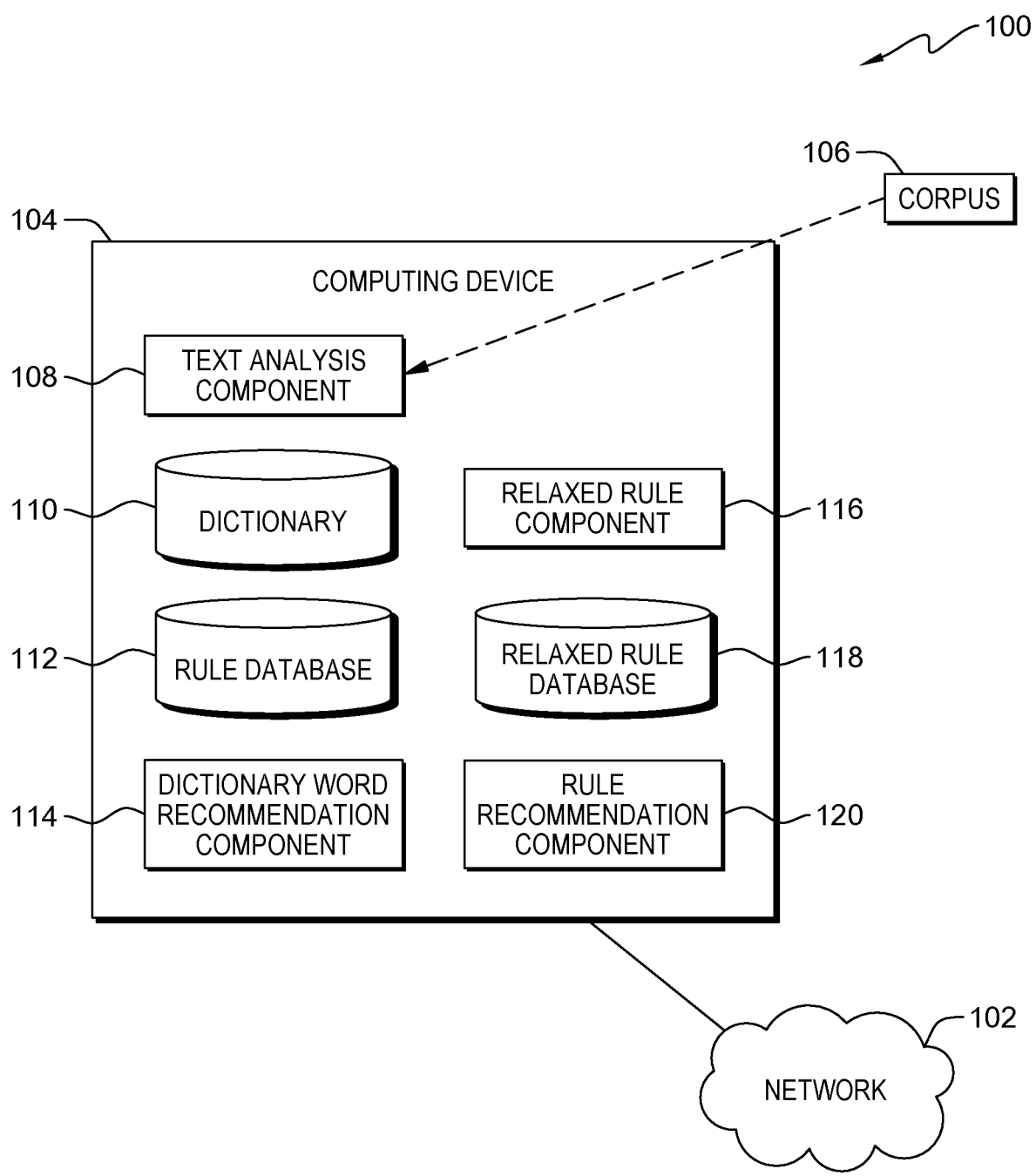
FIG. 1 is a block diagram depicting an exemplary computing environment, in accordance with an embodiment of the present invention.

Embodiments of the present invention are described herein with reference to the Figures. FIG. 1 shows a block diagram of a computing environment 100, in accordance with an embodiment of the present invention. FIG. 1 is provided for the purposes of illustration and does not imply any limitations with regard to the environments in which different embodiments can be implemented. Many modifications to the depicted environment can be made by those skilled in the art without departing from the scope of the invention as recited in the claims.

Computing environment 100 includes computing device 104, which can be interconnected with other devices (not shown) over network 102. Network 102 can be, for example, a telecommunications network, a local area network (LAN), a wide area network (WAN), such as the Internet, or a combination of these, and can include wired, wireless, or fiber optic connections. In general, network 102 can be any combination of connections and protocols that will support communications between computing device 104 and other computing devices (not shown) within computing environment 100.

Computing device 104 can be any programmable electronic device capable of executing machine-readable instructions and communicating with other devices over network 102 and receiving and analyzing a corpus 106, in accordance with an embodiment of the present invention. Computing device 104 includes text analysis component 108, dictionary 110, rule database 112, dictionary word recommendation component 114, relaxed rule component 116, relaxed rule database 118, rule recommendation component 120, and rule recommendation database 122 (also collectively referred to herein as "the system"). Computing device 104 can include internal and external hardware components, as depicted and described in further detail with reference to FIG. 5.

Figure 2:
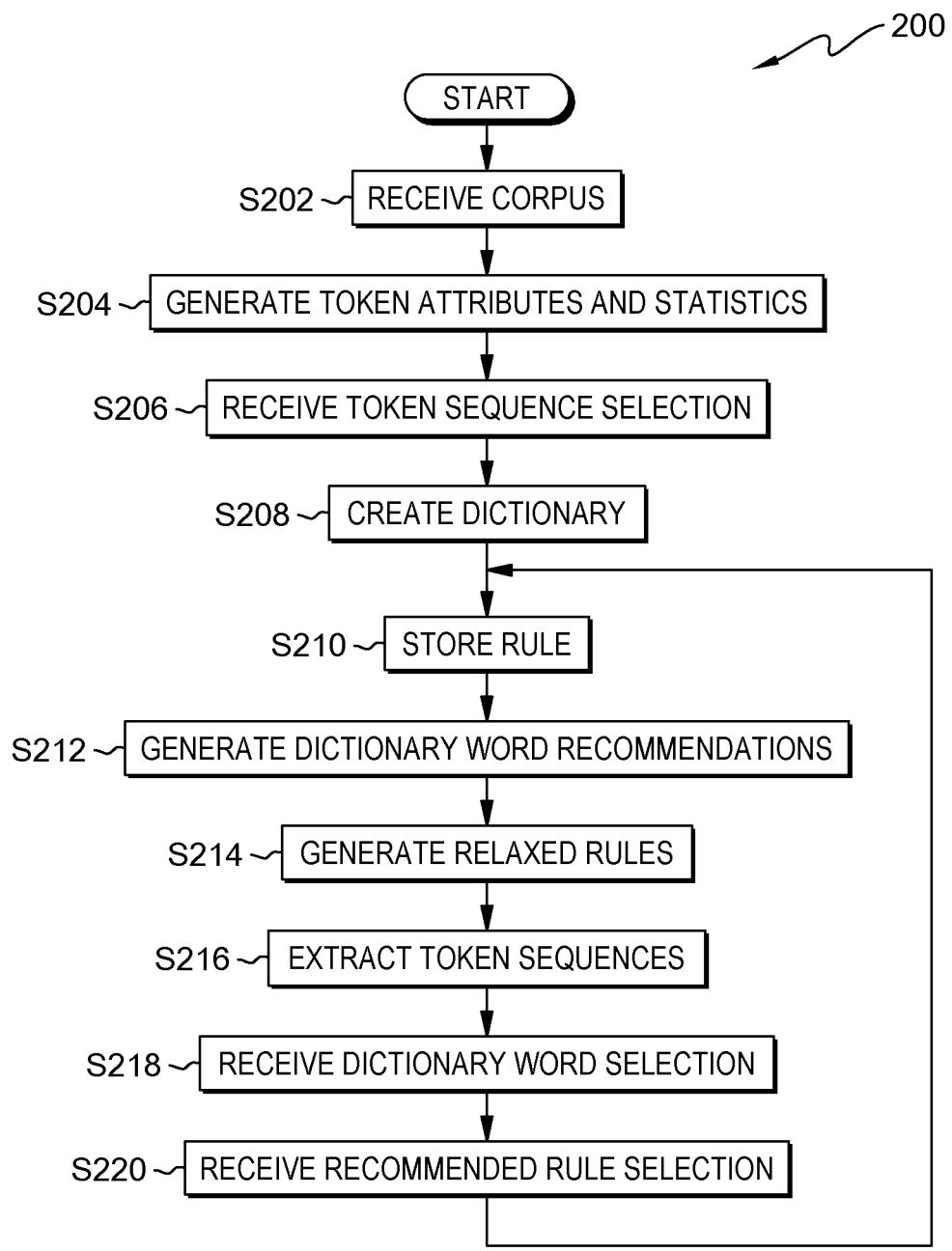
FIG. 2 is a flowchart depicting operations of a method for rule and dictionary creation based on an improvement cycle, in accordance with an embodiment of the present invention.

FIG. 2 is a flow diagram 200 depicting operations of a method for rule and dictionary creation based on an improvement cycle, in accordance with an embodiment of the present invention.

In operation S202, the system receives corpus 106, which comprises textual information.

In operation S204, text analysis component 108 generates token attributes and corpus statistics based on corpus 106. Token attributes may include, for example but without limitation, a part of speech (or "PoS," e.g., noun, verb), a lemma (e.g., "IBM," "acquire," "SoftLayer"), and an annotation that adds metadata to a token sequence (e.g., "product" may be an annotation for the token "SoftLayer"). In an embodiment, text analysis component 108 uses a morphological analysis component and existing annotators to generate token attributes. Corpus statistics may include, for example but without limitation, the frequency with which a token occurs in corpus 106.

In operation S206, the user selects a token sequence to be matched by a rule. A non-limiting example of a token sequence can be, "Paul Wilson founded E-Soft" (where corpus 106 may include additional information such as, "In 1989, Paul Wilson founded E-Soft after . . . ").

In operation S208, the user creates a dictionary 110 based on the token sequence selected in operation S206. In the example above with respect to operation S206, dictionary 110 may be a 'Company' dictionary and contain "E-Soft."

In operation S210, the user creates a rule by selecting token attributes of the selected token sequence to use as conditions of the rule, and stores the rule in rule database 112. A rule is defined as a list of conditions for matching a token sequence. A rule based on the example of operations S206-208 may be the following:

Company-Lemma: acquire-Product

In operation S212, dictionary word recommendation component 114 generates recommended dictionary words extracted from corpus 106 and sorts the recommended dictionary words based on one or more of the contents of rule database 112, token attributes, and corpus statistics. For example, dictionary word recommendation component 114 may generate a list of recommended dictionary words and sort the recommended dictionary words by likelihood of being included in dictionary 110, in descending order.

In a non-limiting embodiment, dictionary word recommendation component 114 generates recommendations by removing a dictionary condition ("[ ]") from a rule in rule database 112 to create a modified rule; listing token sequences from corpus 106 matched by the modified rule; for each token sequence matched by the modified rule, extracting the token in the position to which the removed dictionary condition corresponded; and sorting the extracted tokens by likelihood of being included in dictionary 110, in descending order.

In a non-limiting embodiment, dictionary word recommendation component 114 determines the likelihood of a recommended dictionary word being included in dictionary 110 based on statistical probability, e.g., application of Bayes' theorem, repeatedly updating a uniform prior distribution of the likelihood of inclusion.

A recommended dictionary word based on the example of operations S206-210 and a second token sequence in corpus 106, "GYT Co. will acquire YMovies," may be "GYT Co.," where "GYT Co." replaces the dictionary condition in the acquisition rule previously set out in operation S210:

[ ]-Lemma: acquire-Product

In operation S214, relaxed rule component 116 generates one or more relaxed rules based on one or more rules in rule database 112. A relaxed rule is structured based on looser conditions than the input rule (i.e., the rule in rule database 112). In a non-limiting embodiment, relaxed rule component 116 generates a relaxed rule by selecting r conditions from an original set of n conditions of the input rule (where r<n). Relaxed rule component 116 stores the one or more relaxed rules in relaxed rule database 118. An example of a relaxed rule based on the example of operations S206-S212 may be:

Company-[ ]-Product

In operation S216, rule recommendation component 120 generates a list of token sequences extracted from corpus 106 and matched by the one or more relaxed rules added in operation S214, and sorts the list of token sequences based on one or more of the contents of relaxed rule database 118, token attributes, and corpus statistics.

In operation S218, dictionary word recommendation component 114 provides the sorted list of recommended dictionary words to the user. The user selects a recommended dictionary word for inclusion in dictionary 110.

In operation S220, rule recommendation component 120 generates a list of token sequences (i.e., recommended rules) based on one or more of the contents of relaxed rule database 118, token attributes, and dictionary 110. The user may select a recommended rule for inclusion in database 112, for example adding the following rule to rule database 112:

Company-Lemma: purchase-Product

Operations S212-220 may repeat based on further changes to dictionary 110 and/or rule database 112. For example but without limitation, addition of a recommended dictionary word to dictionary 110 may trigger generation of additional relaxed rules, and addition of a rule to rule database 112 may trigger generation of additional recommended dictionary words.

Figure 3:
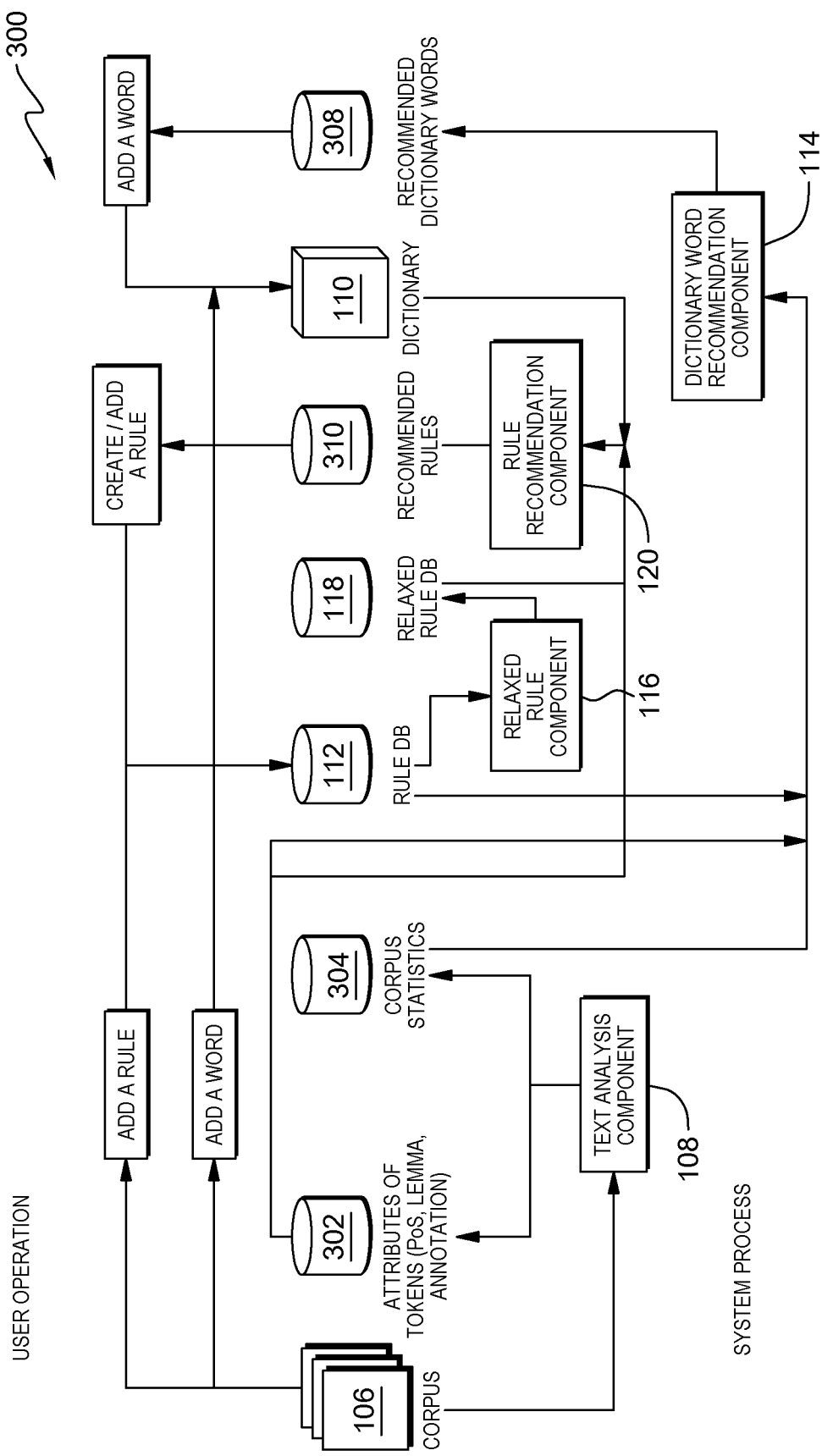
FIG. 3 is a flow diagram depicting operations performed by a user and a system, respectively, in accordance with an embodiment of present invention.

FIG. 3 is a flow diagram 300 depicting operations performed by a user and system, respectively, in accordance with an embodiment of the present invention.

Flow diagram 300 depicts generation of token attributes 302 and corpus statistics 304 by text analysis component 108 based on corpus 106 (S204, system side); initial addition of a dictionary word based on corpus 106 to dictionary 110 (S208, user side); initial addition of a rule based on corpus 106 to rule database 112 (S210, user side); generation of recommended dictionary word(s) 308 by dictionary word recommendation component 114 based on rule database 112, token attributes 302, and corpus statistics 304 (S212, system side); addition of relaxed rules, generated by relaxed rule component 116 based on contents of rule database 112, to relaxed rule database 118 (S214, system side); selection of a recommended dictionary word(s) 308 for inclusion in dictionary 110 (S218, user side); and selection of a recommended rule(s) 310 for inclusion in rule database 112 (S220, user side).

Figure 4A:
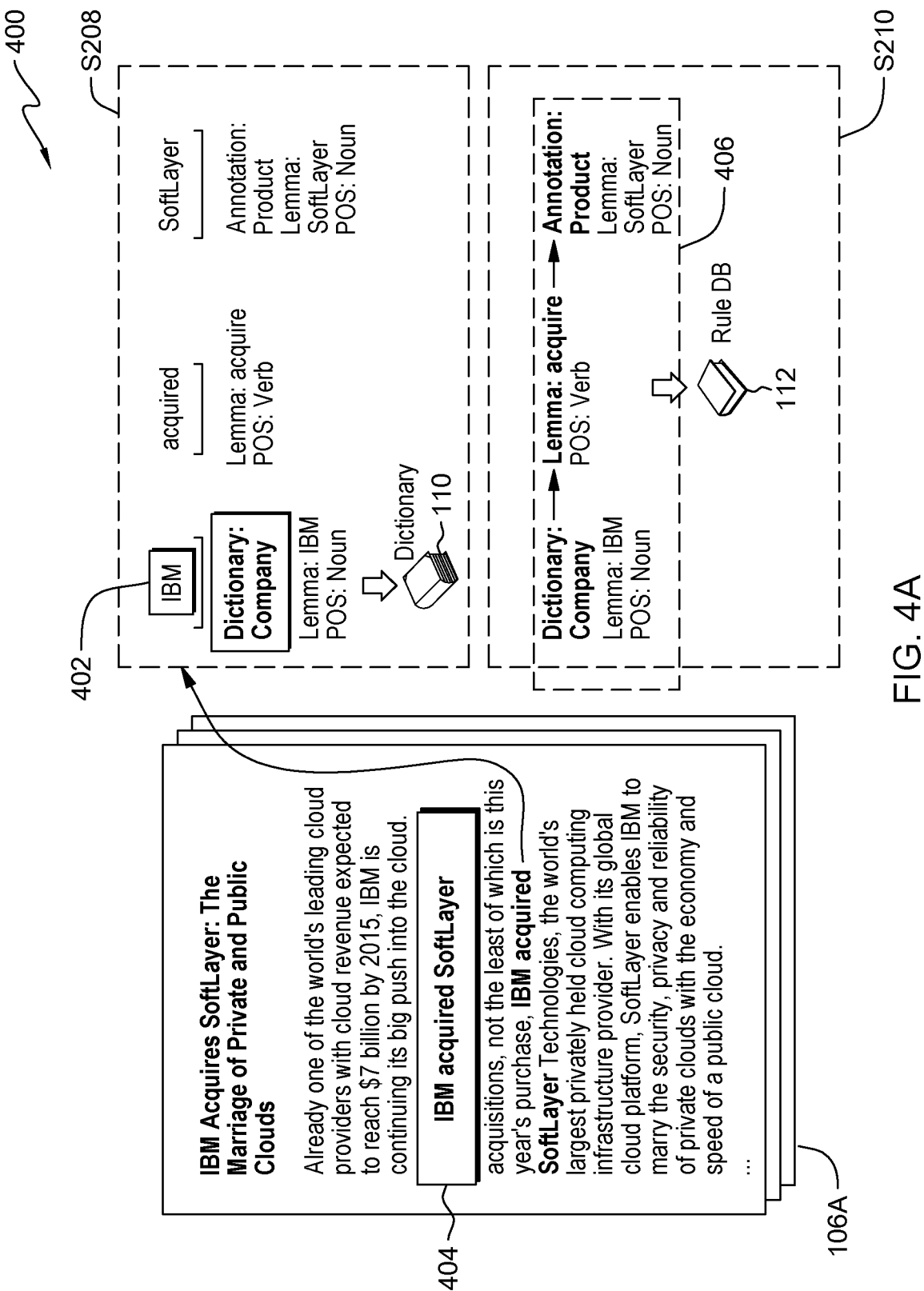
FIG. 4A-C are diagrams further illustrating operations of a method for rule and dictionary creation based on an improvement cycle, in accordance with an embodiment of the present invention.
Figure 4B:
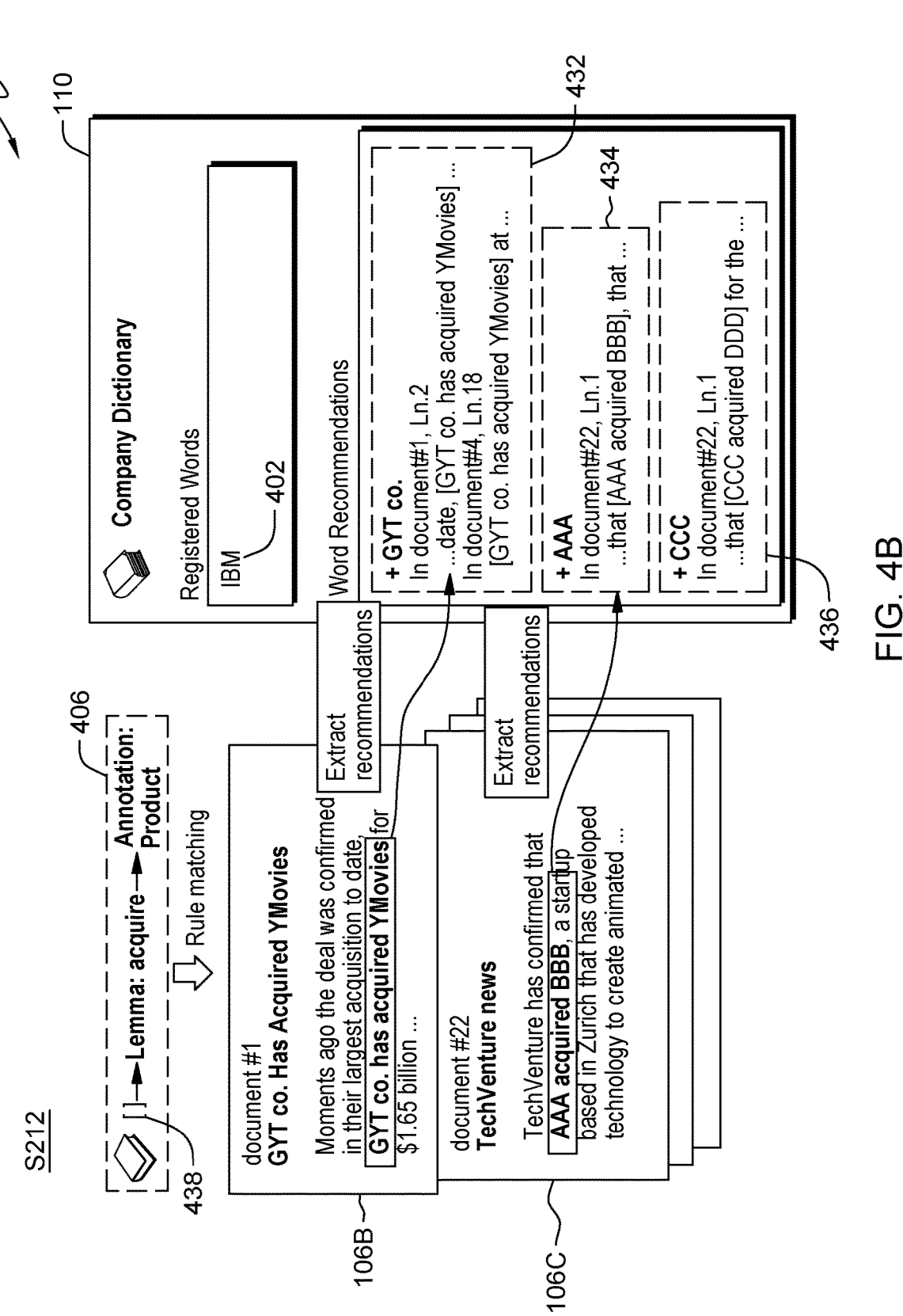
Figure 4C:
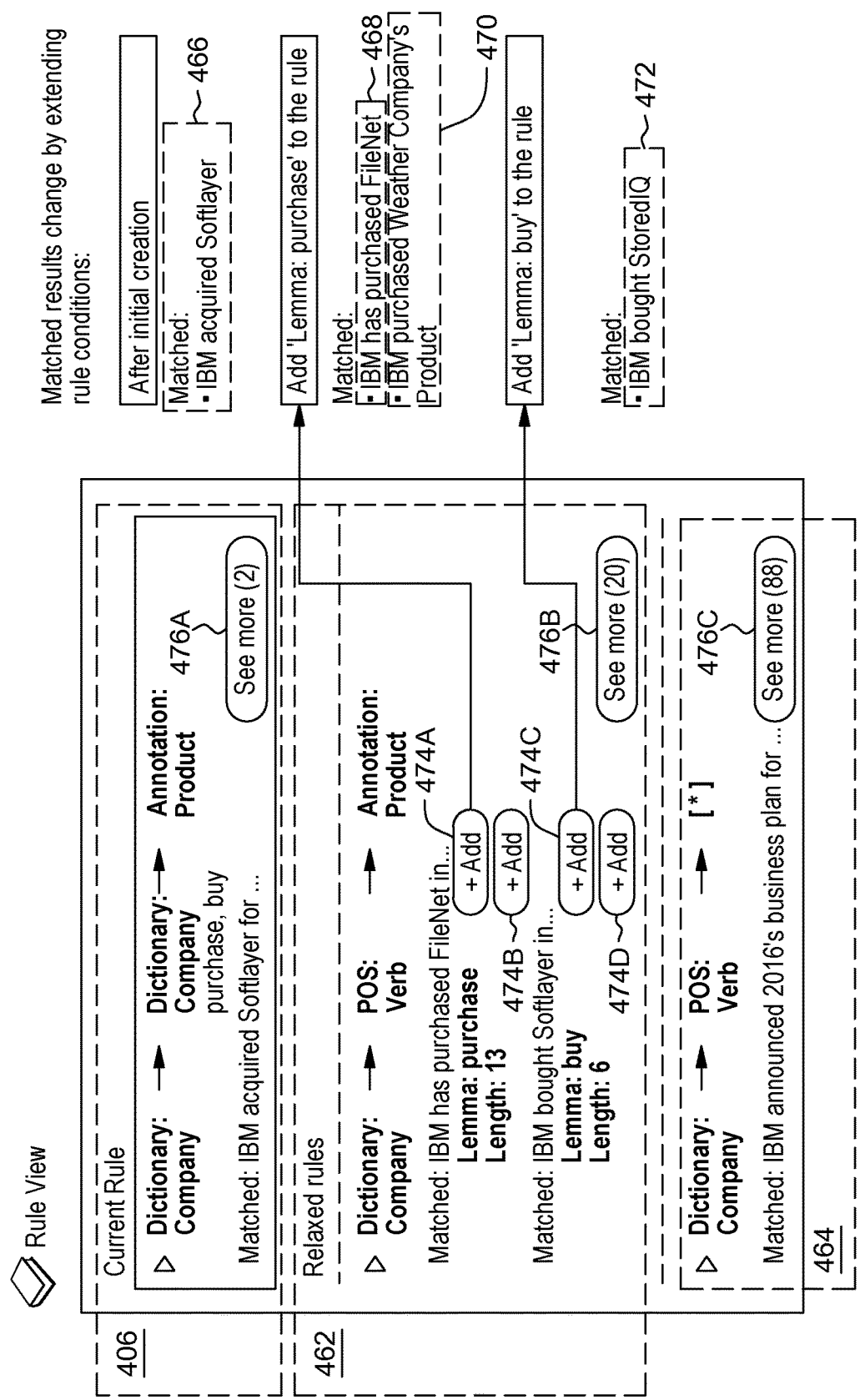

FIG. 4A-C are diagrams further depicting operations of a method for rule and dictionary creation based on an improvement cycle, in accordance with an embodiment of the present invention.

FIG. 4A shows diagram 400 illustrating initial extraction of a dictionary word 402 ("IBM") from corpus 106A, in token sequence 404 ("IBM acquired SoftLayer"), and addition of dictionary word 402 to dictionary 110 (S208). In the illustrated example, dictionary 110 is a 'Company' dictionary.

Diagram 400 also illustrates initial addition of a rule 406 ("Dictionary: Company→Lemma: acquire→Annotation: Product"), based on token sequence 404 extracted from corpus 106A, to database 112 (S210).

FIG. 4B shows diagram 430 illustrating generation of recommended dictionary words 432-436, based on replacement dictionary condition 438 in rule 406 (S212). Diagram 430 shows dictionary 110, which already contains dictionary word 402, and recommendations to add dictionary words "GYT Co." (432), extracted from corpus 106B; "AAA" (434), extracted from corpus 106C; and "CCC" (436), extracted from corpus 106C.

FIG. 4C shows a diagram 460 of rule 406; relaxed rules 462-464; and token sequences 466-472 extracted in operation S216 from corpus 106 (not shown) based on matching rule 406 (token sequence 466), relaxed rule 462 (token sequences 468-470), and relaxed rule 464 (token sequence 472), respectively.

Diagram 460 also includes options 474A-D presented to the user to select a recommended rule(s) 308 for inclusion in rule database 112. For example, the user may select option 474A to add a rule with a 'purchase' lemma ("Company→Lemma: purchase→Product"), or option 474C to add a rule with a 'buy' lemma ("Company→Lemma: buy→Product"), to rule database 112.

Diagram 460 also includes options 476A-C presented to the user to view additional matched token sequences on which rules may be based.

Figure 5:
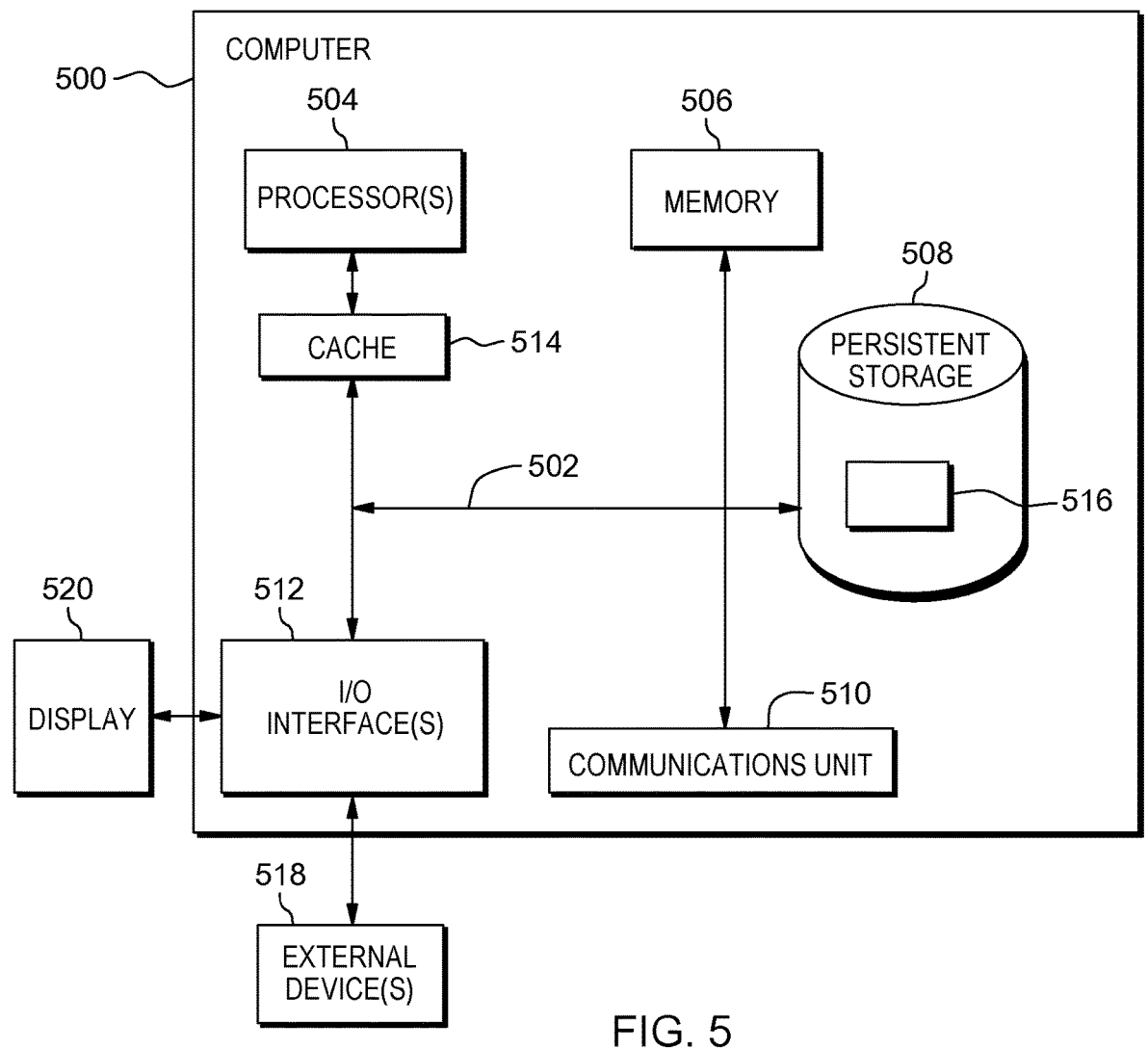
FIG. 5 is a block diagram depicting components of the computing device in FIG. 1 executing a program for rule and dictionary creation based on an improvement cycle, in accordance with an embodiment of the present invention.

FIG. 5 depicts a block diagram 500 of components of a computer, e.g., computing device 104 in computing environment 100, in accordance with illustrative embodiments of the present invention. It should be appreciated that FIG. 5 provides only an illustration of one implementation and does not imply any limitations with regard to the environments in which different embodiments may be implemented. Many modifications to the depicted environment may be made.

Computing device 104 includes communications fabric 502, which provides communications between computer processor(s) 504, memory 506, persistent storage 508, communications unit 510, and input/output (I/O) interface(s) 512, and cache 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) and cache memory 514. In general, memory 506 can include any suitable volatile or non-volatile computer readable storage media. Cache 514 is a fast memory that enhances the performance of computer processor(s) 504 by holding recently accessed data, and data near accessed data, from memory 506.

Program instructions and data used to practice embodiments of the invention, referred to collectively as component(s) 516, are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive can be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. Communications unit 510 can include one or more network interface cards. Communications unit 510 can provide communications through the use of either or both physical and wireless communications links. Component(s) 516 can be downloaded to persistent storage 508 through communications unit 510.

I/O interface(s) 512 allows for input and output of data with other devices that may be connected to computing device 104. For example, I/O interface 512 can provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., component(s) 516, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a touchscreen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for rule and dictionary creation based on an improvement cycle, the method comprising:
    receiving, by one or more computer processors, a corpus, wherein the corpus comprises textual data, and statistics associated with the textual data comprising the frequency with which a token occurs in the corpus;
    creating, by the one or more computer processors, a rule based on a first user input and the statistics;
    creating, by the one or more computer processors, a modified rule based on removing a dictionary condition from the rule, wherein the dictionary condition is automatically removed;
    storing, by the one or more computer processors, in a rule database, the rule and the modified rule;
    creating, by the one or more computer processors, a dictionary based on a token sequence wherein the token sequence comprises tokens based on the statistics and the tokens are annotated with metadata associated with token attributes;
    storing, by the one or more computer processors, in the dictionary, a dictionary word based on a second user input; and
    updating, by the one or more computer processors, the rule database and the dictionary, based on an improvement cycle comprising user selections from system-generated recommendations.

2. The computer-implemented method of claim 1, wherein the first user input comprises a selection of token attributes of a token sequence to use as conditions of the rule.

3. The computer-implemented method of claim 1, wherein system-generated recommendations comprise recommended dictionary words, and wherein the recommended dictionary words are sorted based on likelihood of inclusion in the dictionary.

4. The computer-implemented method of claim 3, further comprising:
    receiving, by one or more computer processors, a user selection of one or more of the recommended dictionary words; and
    storing, by one or more computer processors, the one or more of the recommended dictionary words in the dictionary.

5. The computer-implemented method of claim 1, further comprising:
  generating, by one or more computer processors, one or more relaxed rules based on modification of one or more conditions of the rule stored in the rule database; and
  storing, by one or more computer processors, the one or more relaxed rules in a relaxed rule database.

6. The computer-implemented method of claim 5, further comprising:
  generating, by one or more computer processors, one or more recommended rules based on one or more of contents of the relaxed rule database, token attributes of the corpus, and the dictionary.

7. The computer-implemented method of claim 6, further comprising:
  receiving, by one or more computer processors, a user selection of one or more of the recommended rules; and
  storing, by one or more computer processors, the one or more of the recommended rules in the rule database.

8. A computer program product for analysis rule and dictionary creation based on an improvement cycle, the computer program product comprising:
  one or more computer readable storage media and program instructions stored on the one or more computer readable storage media, the program instructions comprising:
    program instructions to receive a corpus, wherein the corpus comprises textual data, and statistics associated with the textual data comprising the frequency with which a token occurs in the corpus;
    program instructions to create, a rule based on a first user input and the statistics;
    program instructions to create, a modified rule based on removing a dictionary condition from the rule, wherein the dictionary condition is automatically removed;
    program instruction to store, in a rule database, the rule and the modified rule;
    program instructions to create, a dictionary based on a token sequence wherein the token sequence comprises tokens based on the statistics and the tokens are annotated with metadata associated with token attributes;
    program instructions to store, in the dictionary, one or more words based on a user input; and
    program instructions to update the rule database and the dictionary based on an improvement cycle comprising user selections from system-generated recommendations.

9. The computer program product of claim 8, wherein the first user input comprises a selection of token attributes of a token sequence to use as conditions of the rule.

10. The computer program product of claim 8, wherein system-generated recommendations comprise recommended dictionary words, and wherein the recommended dictionary words are sorted based on likelihood of inclusion in the dictionary.

11. The computer program product of claim 10, further comprising:
  program instructions to receive a user selection of one or more of the recommended dictionary words; and
  program instructions to store the one or more of the recommended dictionary words in the dictionary.

12. The computer program product of claim 8, further comprising:
  program instructions to generate one or more relaxed rules based on modification of one or more conditions of the rule stored in the rule database; and
  program instructions to store the one or more relaxed rules in a relaxed rule database.

13. The computer program product of claim 12, further comprising:
  program instructions to generate one or more recommended rules based on one or more of contents of the relaxed rule database, token attributes of the corpus, and the dictionary.

14. The computer program product of claim 13, further comprising:
  program instructions to receive a user selection of one or more of the recommended rules; and
  program instructions to store the one or more of the recommended rules in the rule database.

15. A computer system for rule and dictionary creation based on an improvement cycle, the computer system comprising:
  one or more processors;
  one or more computer readable storage media; and
  program instructions stored on the one or more computer readable storage media for execution by at least one of the one or more processors, the program instructions comprising:
    program instructions to receive a corpus, wherein the corpus comprises textual data, and statistics associated with the textual data comprising the frequency with which a token occurs in the corpus;
    program instructions to create, a rule based on a first user input and the statistics;
    program instructions to create, a modified rule based on removing a dictionary condition from the rule, wherein the dictionary condition is automatically removed;
    program instruction to store, in a rule database, the rule and the modified rule;
    program instructions to create, a dictionary based on a token sequence wherein
    the token sequence comprises tokens based on the statistics and the tokens are annotated with metadata associated with token attributes;
    program instructions to store, in a dictionary, one or more words based on a user input; and
    program instructions to update the rule database and the dictionary based on an improvement cycle comprising user selections from system-generated recommendations.

16. The computer system of claim 15, wherein the first user input comprises a selection of token attributes of a token sequence to use as conditions of the rule.

17. The computer system of claim 15, wherein system-generated recommendations comprise recommended dictionary words, and wherein the recommended dictionary words are sorted based on likelihood of inclusion in the dictionary.

18. The computer system of claim 17, further comprising:
  program instructions to receive a user selection of one or more of the recommended dictionary words; and
  program instructions to store the one or more of the recommended dictionary words in the dictionary.

19. The computer system of claim 15, further comprising:
  program instructions to generate one or more relaxed rules based on modification of one or more conditions of the rule stored in the rule database; and program instructions to store the one or more relaxed rules in a relaxed rule database.

20. The computer system of claim 19, further comprising:
program instructions to generate one or more recommended rules based on one or more of contents of the relaxed rule database, token attributes of the corpus, and the dictionary.

\* \* \* \* \*